US012573801B2

(12) United States Patent
　　　Eidam et al.

(10) Patent No.: US 12,573,801 B2
(45) Date of Patent: Mar. 10, 2026

(54) SHORT PULSE LASER SYSTEM

(71) Applicant: Active Fiber Systems GmbH, Jena
　　　(DE)

(72) Inventors: Tino Eidam, Jena (DE); **Steffen
　　　Hädrich, Jena (DE); Fabian Stutzki**,
　　　Jena (DE)

(73) Assignee: Active Fiber Systems GmbH, Jena
　　　(DE)

( * ) Notice: Subject to any disclaimer, the term of this
　　　patent is extended or adjusted under 35
　　　U.S.C. 154(b) by 615 days.

(21) Appl. No.: 18/010,530

(22) PCT Filed: Jun. 14, 2021

(86) PCT No.: PCT/EP2021/065975
　　　§ 371 (c)(1),
　　　(2) Date: Dec. 15, 2022

(87) PCT Pub. No.: WO2021/254963
　　　PCT Pub. Date: Dec. 23, 2021

(65) Prior Publication Data
　　　US 2023/0275385 A1　　Aug. 31, 2023

(30) Foreign Application Priority Data

Jun. 15, 2020　　(DE) ..................... 10 2020 115 753.3

(51) Int. Cl.
　　　*H01S 3/00*　　　　(2006.01)
(52) U.S. Cl.
　　　CPC .......... *H01S 3/0057* (2013.01); *H01S 3/0071*
　　　　　　　(2013.01); *H01S 3/0092* (2013.01)
(58) Field of Classification Search
　　　CPC .... H01S 3/0057; H01S 3/0071; H01S 3/0092;
　　　　　　H01S 3/005; H01S 3/0085; H01S 3/2383;
　　　　　　　(Continued)

(56) References Cited

U.S. PATENT DOCUMENTS

2005/0190452 A1*　9/2005　Govorkov ............. H01S 3/0057
　　　　　　　　　　　　　　　　359/618
2010/0091359 A1*　4/2010　Yamamoto ........... H01S 3/2325
　　　　　　　　　　　　　　　　359/347
　　　　　　　　　　　(Continued)

FOREIGN PATENT DOCUMENTS

DE　　102014007159　　11/2015
DE　　102018125356　　4/2020
FR　　　3087276　　4/2020

OTHER PUBLICATIONS

A. Klenke et al. "Divided pulse nonlinear compression", Optics
Letters, vol. 38, No. 22, Nov. 15, 2013 (Nov. 15, 2013), pp.
4593-4596, XP001586043 (Year: 2013).*
　　　　　　　　　(Continued)

*Primary Examiner* — Xinning (Tom) Niu

(57)　　　　　ABSTRACT

The disclosure relates to an optical system comprising a
laser source (1) which generates pulsed laser radiation
consisting of a temporal sequence of laser pulses in an input
laser beam (EL), a splitting element (2) which follows the
laser source (1) in the course of the beam and splits each of
the laser pulses into laser pulse replicas separated spatially
and/or temporally from one another, a combination element
(4) which follows the splitting element (2) in the course of
the beam and superimposes the laser pulse replicas in a
respective laser pulse in an output laser beam. It is the task
of the disclosure to provide an improved optical system
compared to the prior art. It should be possible to generate
particularly short and thus spectrally broadband laser pulses
of high power with the optical system. The disclosure
proposes that at least one multipass cell (3) is arranged in the
beam path between the splitting element (2) and the com-
bination element (4), through which the laser pulse replicas
propagate, wherein the multipass cell (3) contains a medium
　　　　　　　　　(Continued)

1　　　　2　　　　3　　　　4　　　　5 in which the laser pulse replicas undergo nonlinear spectral broadening.

14 Claims, 1 Drawing Sheet

(58) Field of Classification Search
  CPC ....... G02B 27/106; G02B 17/004; G02F 1/35; G02F 1/3501
  See application file for complete search history.

(56) References Cited

U.S. PATENT DOCUMENTS

| | | | |
|---|---|---|---|
| 2012/0212804 A1* | 8/2012 | Sarkisyan | H01S 3/2325 |
| | | | 359/347 |
| 2022/0399695 A1* | 12/2022 | Metzger | H01S 3/094076 |

OTHER PUBLICATIONS

M. Kaumanns et al., "Multipass spectral broadening of 18 mJ pulses compressible from 1.3 ps to 41 fs," Opt. Lett. 43, 5877-5880 (2018) (Year: 2018).*

Internationaler Recherchenbericht und Schriftlicher Bescheid [International Search Report and the Written Opinion] Dated Oct. 12, 2021 From the International Searching Authority Re. Application No. PCT/EP2021/065975. (14 Pages).

Prüfungsantrag [Request for Examination] Dated Feb. 15, 2021 From the Deutsches Patent- und Markenamt [German Patent and Trademark Office] Re. Application No. 102020115753.3. (4 Pages).

Klenke et al. "Coherent Combination of Spectrally Broadened Femtosecond Pulses for Nonlinear Compression", Optics Letters, XP001589934, 39(12): 3520-3522, Jun. 15, 2014.

Klenke et al. "Divided-Pulse Nonlinear Compression", Optics Letters, XP001586043, 38(22): 4593-4596, Nov. 15, 2013.

* cited by examiner

SHORT PULSE LASER SYSTEM

RELATED APPLICATIONS

This application is a National Phase of PCT Patent Application No. PCT/EP2021/065975 having International filing date of Jun. 14, 2021, which claims the benefit of priority of Germany Patent Application No. 10 2020 115 753.3 filed on Jun. 15, 2020. The contents of the above applications are all incorporated by reference as if fully set forth herein in their entirety.

FIELD AND BACKGROUND OF THE INVENTION

The present disclosure relates to an optical system comprising.

a laser source which generates pulsed laser radiation consisting of a temporal sequence of laser pulses in an input laser beam, a splitting element following the laser source in the beam path, which splits the laser pulses respectively into spatially and/or temporally separated laser pulse replicas, a combination element following the splitting element in the beam path, which superimposes the laser pulse replicas in a respective laser pulse in an output laser beam.

Laser systems for generating ultrashort laser pulses in the pico- and femtosecond range have been receiving a great deal of attention for years.

A variety of applications of such systems require a shorter pulse duration than supported by the gain medium of the laser system. In addition, effects in the optical amplifier, such as saturation or gain narrowing, can lead to a decrease in the spectral bandwidth of the laser radiation, which results in an undesired increase in pulse duration at the output of the laser system.

A well-known approach to shortening the pulse duration is to exploit nonlinear effects to coherently generate new spectral components. The corresponding nonlinear interactions can occur in the amplifying medium (nonlinear amplification) or in separate components downstream of the optical amplifier in the beam path (nonlinear pulse compression). The most commonly exploited nonlinear interaction of laser radiation with a medium to increase spectral bandwidth is self-phase modulation (SPM). SPM-induced spectral broadening can be realized in media of various geometries, e.g. in optical waveguides (e.g. in optical fibers).

SPM is an intensity-dependent effect, which means that in interaction regions of higher intensity a stronger spectral broadening takes place than in regions of lower intensity. Consequently, a laser beam with a typical Gaussian beam profile experiences spatially inhomogeneous spectral broadening during propagation through a nonlinear medium, e.g., a glass plate. The spectral broadening is more pronounced near the beam axis than in the edge regions farther from the beam axis. However, many applications require a spectral bandwidth of the laser pulses that is homogeneous over the beam profile.

A well-known approach to achieve spatially homogeneous spectral broadening is the propagation of laser pulses in waveguides. These can be, for example, conventional glass fibers, photonic crystal fibers or hollow-core fibers. In hollow-core fibers, gases (noble gases, nitrogen or others) are typically used as a nonlinear medium. In these fibers, the propagating eigensolution of the laser radiation (transverse mode, for example the transverse fundamental mode) is imprinted in its entirety with the nonlinear phase and thus the spectral broadening (see S. Hädrich, H. Carstens, J. Rothhardt, J. Limpert, and A. Tünnermann, "Multi-gigawatt ultrashort pulses at high repetition rate and average power from two-stage nonlinear compression," Opt. Express 19, 7546-7552, 2011).

Depending on the fiber type used, glass fiber or hollow-core fiber, different limits arise with regard to the pulse energy that can be propagated and thus compressed. In fibers with a glass core, the peak pulse power is limited by self-focusing; in gas-filled hollow-core fibers, ionization effects typically determine the pulse energy that can be coupled in. Therefore, glass fibers are suitable for nonlinear pulse compression down to the range of a few µJ pulse energy, whereas hollow core fibers allow downstream pulse compression at pulse energies in the mJ range. Due to negligible dispersion, hollow-core fiber-based approaches are suitable for pulse compression down to the range of a few oscillation cycles of the electromagnetic field of the laser radiation, corresponding to a pulse duration supported only by an enormous spectral bandwidth. Conventional hollow core fibers have core diameters of a few 100 µm and fiber lengths in the range of one meter or less. The limitation due to ionization effects can be raised to some extent by so-called stretched hollow core fibers. Increasing the core diameter (up to 1 mm) allows the coupling of higher pulse energies without interfering ionization as well as a reduction of intrinsic propagation losses. With an extension of the fiber length (up to >10 m) a sufficiently strong nonlinear interaction can be realized. To minimize bending losses, the long fibers are held stretched (see DE 10 2007 048 769 B3). Current record values in terms of spectrally broadened pulse energy is in the range of 20 mJ (see Vincent Cardin, Nicolas Thire, Samuel Beaulieu, Vincent Wanie, Francois Legare, and Bruno E. Schmidt, "0.42 TW 2-cycle pulses at 1.8 µm via hollow-core fiber compression," Appl. Opt. Phys. Lett. 107, 181101, 2015).

Another well-known approach to spatially homogeneous spectral broadening of pulsed laser radiation (see Nenad Milosevic, Gabriel Tempea, and Thomas Brabec, "Optical pulse compression: bulk media versus hollow waveguides," Opt. Lett. 25, 672-674, 2000) exploits the fact that spectral broadening in a medium with an imaging mirror array, called a multipass cell, which is designed as a stable resonator, homogenizes spatially.

A multipass cell comprises an arrangement of focusing mirrors which redirect a laser beam coupled into the multipass cell at each reflection point so that beam propagation is limited to a predefined volume along a controlled propagation path in the multipass cell until after a plurality of reflections and thus passing through the volume of the multipass cell the laser beam leaves the multipass cell. Known designs of multipass cells are called e.g. White cells or Herriott cells.

The use of a multipass cell for spatially homogeneous spectral broadening requires that the mirrors of the multipass cell are shaped and arranged such that the multipass cell forms a stable optical resonator characterized by the existence of Gaussian beams as transverse eigensolutions of the resonator, which experience the desired spatial homogenization of spectral broadening in the same way as transverse eigensolutions in nonlinear waveguides.

A dielectric material (e.g., a glass plate) or even a gas (e.g., a noble gas) can be used as the nonlinear medium located in the multipass cell.

The destruction threshold of the mirrors used to realize the multipass cell limits the compressible pulse energy or the peak pulse power that can be coupled into the cell. The destruction threshold depends on the intensity of the laser radiation. In principle, the intensity on the mirror surfaces can be reduced by increasing the mirror spacing. Furthermore, it is possible to work close to a concentric mirror configuration, which results in the largest beam radii on the mirror surfaces among all symmetrical arrangements. However, this configuration leads to small foci of the laser radiation, which in turn must be taken into account in the design with regard to the nonlinear interaction in the medium. On the one hand, destruction of the medium or excessive ionization must be avoided, and on the other hand, the accumulated nonlinear phase per rotation must not exceed a certain limit value in order to avoid degradation of the beam quality and, again, inhomogeneous spectral broadening.

It is known from the prior art to circumvent intensity-related limitations in laser systems by splitting each laser pulse of an input laser beam into spatially separated propagating laser pulse replicas, after which the spatially separated partial beams, each of which has a correspondingly lower power than the input laser beam, propagate through intensity-limited components of the laser system. Subsequently, a coherent or incoherent combination of the spatially separated partial beams takes place in an output laser beam of high power. In optical amplifier systems, especially fiber-based amplifier systems, spatially separated amplification has enabled penetration into new parameter ranges (see Marco Kienel, Michael Müller, Arno Klenke, Jens Limpert, and Andreas Tünnermann, "12 mJ kW-class ultrafast fiber laser system using multidimensional coherent pulse addition," Opt. Lett. 41, 3343-3346, 2016). Analog, a single laser pulse can be split into temporally separated laser pulse replicas, propagating temporally separated through intensity-limited components of the laser system, and then coherently superimposed back into a laser pulse in the output laser beam. Both approaches can also be combined.

SUMMARY OF THE INVENTION

The present disclosure relates to an optical system of the type indicated at the beginning by providing at least one multipass cell arranged in the beam path between the splitting element and the combination element, through which the laser pulse replicas propagate.

By nonlinear spectral broadening, the disclosure generally means the generation of optical power in new spectral regions by nonlinear interaction.

The disclosure is based on the basic idea of applying the concept of beam splitting, i.e. the generation of spatially and/or temporally separated propagating laser pulse replicas in combination with homogeneous spectral broadening in a multipass cell.

In order to avoid reaching the destruction threshold of the mirrors of the multipass cell, and to do so without rampantly increasing the mirror spacing and thus the size of the element used for spectral broadening, according to the disclosure each laser pulse is converted into a plurality (two or more) of laser pulse replicas, which are then coupled into the multipass cell spatially and/or temporally separated from each other, propagate through the medium contained therein (multiple times) and thereby undergo spectral broadening. Subsequently, the laser pulse replicas associated with an original laser pulse are superimposed again to form a laser pulse in the output laser beam.

In the coherent superposition of laser pulse replicas, the phase position of the individual laser pulse replicas is of decisive importance. At the point of superposition, the phase position must in each case be such that temporally largely invariant and largely constructive interference occurs; thereby the phase position can be passively stable or actively stabilized. Well-known approaches are applicable here, for example by using a Sagnac interferometer (see Florent Guichard, Yoann Zaouter, Marc Hanna, Franck Morin, Clemens Hönninger, Eric Mottay, Frédéric Druon, and Patrick Georges, "Energy scaling of a nonlinear compression setup using passive coherent combining," Opt. Lett. 38, 4437-4440, 2013) for passively stabilized superposition, or a multichannel Mach-Zehnder interferometer for actively stabilized coherent superposition scalable with respect to the number of laser pulse replicas (see Arno Klenke, Marco Kienel, Tino Eidam, Steffen Hädrich, Jens Limpert, and Andreas Tünnermann, "Divided-pulse nonlinear compression," Opt. Lett. 38, 4593-4596, 2013, and Arno Klenke, Steffen Hädrich, Marco Kienel, Tino Eidam, Jens Limpert, and Andreas Tünnermann, "Coherent combination of spectrally broadened femtosecond pulses for nonlinear compression," Opt. Lett. 39, 3520-3522, 2014).

The spatially and/or temporally separated laser pulse replicas propagate through a single multipass cell. It is also conceivable that the spatially separated partial beams propagate through spatially separated multipass cells, wherein they there each undergo an (almost) identical spectral broadening and are subsequently spatially superimposed in the output laser beam.

A chirp imprinted on the laser pulses can be largely removed by suitable dispersive elements (e.g., chirped mirrors), ultimately resulting in the desired pulse duration reduction.

In one possible embodiment, the splitting element and/or the combination element are each designed as a diffractive beam splitter.

The splitting element and/or the combination element each comprise a reflective element with zones of different reflectivity. The splitting element and the combination element each have two element pairs, each consisting of a continuously reflective element and a reflective element with zones of different reflectivity, at which the laser radiation is reflected several times in succession, the partial beams forming a two-dimensional array in a plane perpendicular to the propagation direction. This makes it possible to realize a compact parallel beam path of the spatially separated partial beams in which the laser pulse replicas propagate. In this case, the number of partial beams does not have to correspond to the number of zones of different reflectivity. It is expedient that the splitting element and the combination element are of identical design, so that optical path length differences are compensated for during splitting and combination.

To generate temporally separate laser pulse replicas, it can be expedient to provide that the splitting element and the combination element each have at least one beam splitter and at least one optical delay path. The laser pulses are guided over optical delay paths of different lengths, resulting in correspondingly different time delays of the laser pulse replicas.

In a further embodiment, an error signal detector is provided which derives an error signal from the laser beam, and a controller which derives at least one control signal from the error signal for controlling at least one optical modulator arranged in the beam path. This control loop can be used to actively control the coherent superposition in the output laser beam. The control can be performed, for example, according to the well-known LOCSET principle or by sequential phase stabilization (see A. Klenke, M. Müller, H. Stark, A. Tünnermann, and J. Limpert, "Sequential phase locking scheme for a filled aperture intensity coherent combination of beam arrays," Opt. Express 9, 12072-12080, 2018). Thereby the optical modulator can have, for example, an array of phase modulators corresponding to the array of spatially separated partial beams, with a phase modulator associated with each of the partial beams. Thereby not all elements of the array necessarily have to be controlled. By controlling the phase position of the partial beams, optical path length differences of the partial beams, which may occur and, if applicable, fluctuate due to external influences, can be actively compensated.

In a further embodiment, an arrangement of power setting elements is provided in the beam path, with each partial beam being assigned a power control element which influences the power of the laser pulses in this partial beam. Due to imperfections in the division of the laser pulses, the individual partial beams can have different intensities. This can be compensated by the power setting elements (e.g. optical attenuators).

Expediently the multipass cell has at least two mirrors, whose shape and arrangement are selected so that the multipass cell forms a stable optical resonator. As explained above, in a stable optical resonator a Gaussian mode is found as a transverse eigensolution, so that the desired spatial homogenization of the spectral broadening occurs. The mirrors of the cell may have dielectric layers that exhibit minimal dispersion over a wide spectral bandwidth. Alternatively, metallic mirrors can form the multipass cell to increase the reflection bandwidth as well as to minimize dispersion over an even wider range. However, it is also possible for the multipass cell to have dielectric mirrors, with the medium and dielectric mirrors having an overall anomalous dispersion. In this way, the multipass cell can produce spectral broadening and simultaneous temporal compression (soliton self-compression) of the laser pulse replicas.

BRIEF DESCRIPTION OF THE DRAWINGS

FIG. 1 shows a schematic representation of an optical system according to the disclosure as a block diagram;

FIG. 2 shows a splitting or combination element based on multiple reflection;

FIG. 3 shows a schematic representation of an optical system according to the disclosure in a second embodiment as a block diagram;

FIG. 4 shows a schematic representation of an optical system according to the disclosure in a third embodiment as a block diagram.

DETAILED DESCRIPTION

The present disclosure relates to an optical system of the type indicated at the beginning by providing at least one multipass cell arranged in the beam path between the splitting element and the combination element, through which the laser pulse replicas propagate, wherein the multipass cell contains a medium in which the laser pulse replicas undergo nonlinear spectral broadening.

In the embodiment example of FIG. 1, an input laser beam of pulsed laser radiation coming from a laser source 1 (e.g. comprising a mode-locked oscillator with downstream amplifier) is split into a number of spatially separated (and parallel) partial beams by means of a splitting element 2. The function of the splitting element 2 is expediently based on an arrangement of partially reflective mirrors or polarizing beam splitters in a cascaded arrangement, diffractive elements or an arrangement of mirrors with zones of different reflectivity (see below). The spatially separated partial beams are coupled into a multipass cell 3. This has at least two mirrors whose spacing and shape are selected according to a stable resonator configuration. The multipass cell contains a nonlinear medium (e.g. a transparent solid or a gas) which imprints a phase (predominantly) by SPM to the laser pulse replicas propagating in the partial beams and consequently causes a spectral broadening. Likewise, other nonlinear processes can also generate new spectral components. In this case, an approximately identical nonlinear phase is imprinted on all laser pulse replicas. The spatially separated partial beams do not exhibit optical path differences greater than the coherence length of the spectrally broadened laser pulse replicas. The spectrally broadened laser pulse replicas are coupled out of the multipass cell 3 (e.g. through a hole in one of the mirrors), and subsequently superimposed and spatially coherently combined by a combination element 4. This can be followed by a pulse compression stage 5, e.g. using suitable chirped mirrors. Likewise, the mirrors of the multipass cell 3 as well as the nonlinear medium contained therein can have an anomalous total dispersion in sum and thus cause a largely identical soliton self-compression of all partial beams or laser pulse replicas in the multipass cell 3.

FIG. 2 shows a splitting or combination element based on multiple reflection, as can be used in the system according to the disclosure. The element consists of four sub-elements A, B, C, D. The first sub-element A is a mirror with a reflectivity as high as possible. The second sub-element B comprises (in the example shown) exemplarily four zones with different reflectivity. The laser beams take the path shown in FIG. 2. The reflectivities of the zones of the sub-element B can be selected so that the incident input laser beam EL is divided into partial beams in a certain ratio. An example is a splitting in equal parts on all partial beams. This is achieved by choosing the reflectivities of the four zones to be 75%, 66%, 50% and 0%. The outgoing four partial beams then fall on plane-parallel surfaces of the two sub-elements C and D, which are tilted towards the sub-elements A, B. Sub-element C is again highly reflective. Sub-element D again has four zones of varying reflectivity (as before). As a result, as shown, a two-dimensional array of 16 partial beams is generated in a plane perpendicular to the beam path. The number of zones of different reflectivity at the sub-elements B and D can be arbitrary in each case, according to the desired number of partial beams, i.e. according to the splitting ratio. It should be noted that the number of zones does not necessarily have to be equal to the number of partial beams. A zone can also reflect the beam several times. The splitting element 2 and the combination element 4 can be identical and arranged in such a way that the resulting path lengths differences of the 16 partial beams almost cancel each other out (ideally within the coherence length).

It should be noted that the foci of the parallel partial beams in the multipass cell 3 may overlap. This can lead to undesirable non-linear interactions of the partial beams. The special feature of the splitting/combination element shown in FIG. 2 is that the laser pulse replicas of the parallel partial beams are temporally offset from each other, so that interactions between the laser pulse replicas are avoided. The time offset is determined by the distances of the highly reflective to the segmented mirrors and can be chosen according to the laser pulse duration in the input laser beam.

If necessary, imprinted angles between the spatially separated partial beams can reduce or avoid an overlap of the foci.

The division into partial beams of as identical power as possible is important because all partial beams in the multipass cell 3 should undergo an almost identical nonlinear interaction, resulting in an almost identical pulse duration shortening and, moreover, this is the basis for a high combination efficiency in the downstream coherent superposition in the combination element 4 to generate the output laser beam. For this purpose, as shown in FIG. 3, an array of power actuators 6 adapted to the partial beam array can be provided. In the simplest case, this can be realized, for example, by an array of adjustable attenuators.

A detection of path length differences in the sub-wavelength range is performed in the embodiment example of FIG. 3 by means of an error signal detector 7. For this purpose, known arrangements can be used (see, e.g., Arno Klenke, Michael Müller, Henning Stark, Andreas Tünnermann, and Jens Limpert, "Sequential phase locking scheme for a filled aperture intensity coherent combination of beam arrays," Opt. Express 26, 12072-12080, 2018). The correction or stabilization of the interferometric superposition in the combination element 4 can be performed by an array of phase modulators 8 (e.g., mirror array with piezo actuators), which in turn is adapted in its geometry to the partial beam array. The electronic control loop used for this purpose is not shown in FIG. 3. As an alternative to the active stabilization described above, passive approaches can also be used.

In the example shown in FIG. 4, the splitting element 2 splits the input laser pulses into at least two temporally separated laser pulse replicas with ideally identical pulse energy, in this example finely adjusted by a pulse-selective power control 9. In the multipass cell 3, the corresponding temporally separated spectral broadening of the laser pulse replicas is performed with subsequent coherent combination at 4 to generate the output laser beam. Also with the temporal splitting of the laser pulses the relative phase position of the laser pulse replicas and their stability is essential for a stable emission where most of the pulse energy is contained in the output laser beam. Known approaches for detection and active stabilization can also be used here. In the embodiment example, elements for detection of the relative phase position 10 and for corresponding active control 11 are included in the setup for this purpose. The electronic control components are again not shown in FIG. 4. Especially for the temporally separated spectral broadening of the laser pulse replicas, passive approaches (i.e. approaches that do not require control electronics) can be used to set the correct relative phase position of the laser pulse replicas in the combination.

To split the individual laser pulses of the input laser beam into a temporal sequence of laser pulse replicas at 13, partially reflecting mirrors, polarizing elements (e.g. thin film polarizer or polarization beam splitter) can be used, for example, or crystals with different transit times at different polarizations (birefringent crystals) can be used. A corresponding inverted arrangement allows the coherent combination at 4.

Alternatively (not shown), beam reversal can occur at the output of the system, i.e. after passing through the multipass cell 3, e.g. by means of a Faraday rotator in combination with a highly reflective mirror. After reflection, the laser pulse replicas propagate in the reverse direction through the multipass cell 3, using the splitting element 2 in the reverse direction for combination.

It is important that especially at the output of the system the optical components used support the spectral bandwidth of the nonlinear broadened laser pulses.

It should be noted that a multi-dimensional division, i.e. into laser pulse replicas separated from each other both spatially and temporally, is possible. This corresponds, for example, to a combination of the embodiments of FIGS. 3 and 4.

To overcome problems that may arise from the dispersion of the mirrors of the multipass cell 3 and the associated limitations in the generation of extremely broadband (few-cycle) laser pulses, metallic mirrors may be used in the multipass cell 3, possibly consisting of a metallic layer on a substrate characterized by good thermal conductivity (e.g. copper or sapphire).

The disclosure provides an improved optical system compared to the prior art. For example, it should be possible to generate particularly short and thus spectrally broadband laser pulses of high power and pulse energy with the optical system.

The invention claimed is:

1. Optical system comprising:
a laser source which generates pulsed laser radiation consisting of a temporal sequence of laser pulses in an input laser beam (EL),
a splitting element following the laser source in the beam path, which splits each of the laser pulses into laser pulse replicas separated spatially and/or temporally from each another,
a combination element which follows the dividing element in the beam path and which superimposes the laser pulse replicas in a respective laser pulse in an output laser beam,
wherein at least one multipass cell is arranged in the beam path between the splitting element and the combination element, through which multipass cell the laser pulse replicas propagate, the multipass cell containing a medium in which the laser pulse replicas undergo a nonlinear spectral broadening;
wherein the laser pulse replicas propagate through the multipass cell in spatially separated partial beams.

2. Optical system according to claim 1, comprising a reflector arranged in the beam path behind the multipass cell, which reflector reflects the laser pulse replicas after propagation through the multipass cell, after which the laser pulse replicas propagate in the reverse direction through the multipass cell, wherein the combination element is formed by the splitting element, in that the splitting element superimposes the laser pulse replicas after propagation through the multipass cell in the backward direction in a respective laser pulse.

3. Optical system according to claim 1, wherein the dividing element and/or the combination element comprises a reflective element having zones of different reflectivity.

4. Optical system according to claim 3, wherein the splitting element and/or the combination element each comprise two or more reflective elements (A, B, C, D) at which the laser radiation is successively reflected one or more times.

5. Optical system according to claim 3, wherein the dividing element and the combination element have an identical construction.

6. Optical system according to claim 1, wherein the splitting element and the combination element each comprise at least one beam splitter and at least one optical delay path.

7. Optical system according to claim 1, wherein the partial beams form a two-dimensional array in a plane perpendicular to the beam path.

8. Optical system according to claim 1, comprising an error signal detector which derives an error signal from the laser radiation, and a controller which derives at least one actuating signal from the error signal for driving at least one optical modulator arranged in the beam path.

9. Optical system according to claim 8, wherein the at least one optical modulator comprises an array of phase modulators corresponding to the array of partial beams, each of the partial beams having a phase modulator associated therewith.

10. Optical system according to claim 1, wherein an arrangement of power actuators is located in the beam path, wherein a power actuator is associated with each partial beam which influences the power of the laser pulse replicas in that partial beam.

11. Optical system according to claim 1, wherein the multipass cell comprises at least two mirrors whose shape and arrangement are selected such that the multipass cell forms a stable optical resonator.

12. Optical system according to claim 11, wherein the multipass cell comprises spherical mirrors in concentric arrangement.

13. Optical system according to claim 11, wherein the multipass cell comprises metallic mirrors.

14. Optical system according to claim 11, wherein the multipass cell comprises dielectric mirrors, wherein the medium and dielectric mirrors have anomalous total dispersion.

\* \* \* \* \*